Feb. 8, 1938.   E. L. PRIBYL   2,107,958
AUGER
Filed March 22, 1937

Elmer L. Pribyl, INVENTOR
BY Victor J. Evans & Co.
ATTORNEYS

Patented Feb. 8, 1938

2,107,958

UNITED STATES PATENT OFFICE 2,107,958

AUGER

Elmer L. Pribyl, Wymore, Nebr.

Application March 22, 1937, Serial No. 132,416

1 Claim. (Cl. 255—19)

The invention relates to an auger and more especially to a post hole auger.

The primary object of the invention is the provision of an auger of this character, wherein power is transmitted thereto from any suitable source for the operation of the auger and the latter is susceptible of being guided to the work for the formation in the soil of post holes or the like, the auger in its entirety being of novel construction.

Another object of the invention is the provision of an auger of this character, wherein a gear housing or casing constitutes a head which can be suspended from a hanger and also is fitted with a handle bar enabling convenient placement and guiding thereof to and from the work or during operation.

A further object of the invention is the provision of an auger of this character, which is extremely simple in construction, thoroughly reliable and effective in operation, readily portable, strong, durable, and inexpensive to manufacture.

With these and other objects in view, the invention consists in the features of construction, combination and arrangement of parts as will be hereinafter fully described, illustrated in the accompanying drawing, which discloses the preferred embodiment of the invention and pointed out in the claim hereunto appended.

In the accompanying drawing.

Similar reference characters indicate corresponding parts throughout the several views in the drawing.

Figure 1:
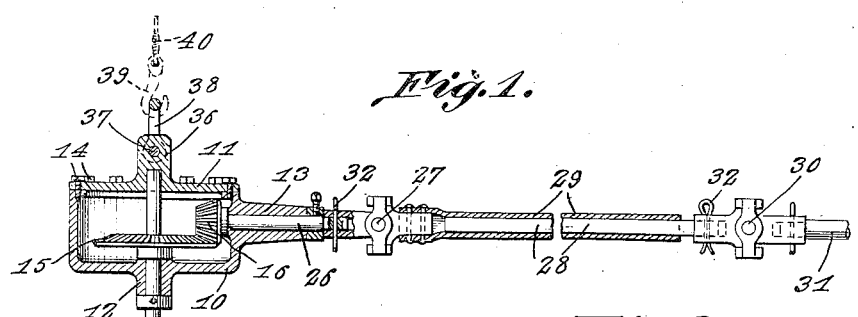
Figure 1 is a side elevation partly in section of an auger constructed in accordance with the invention.
Figure 2:
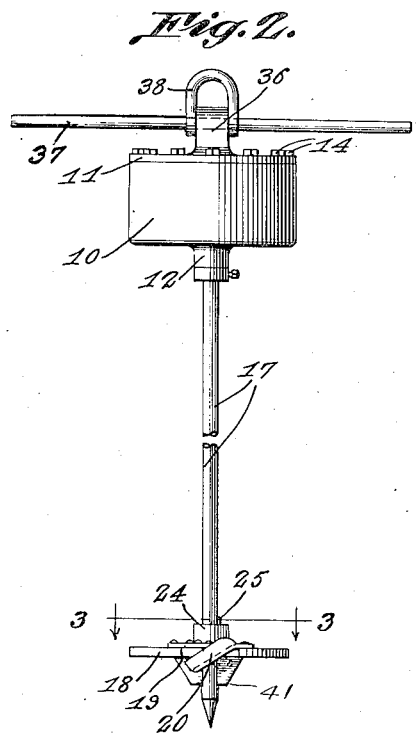
Figure 2 is an elevation thereof.
Figure 3:
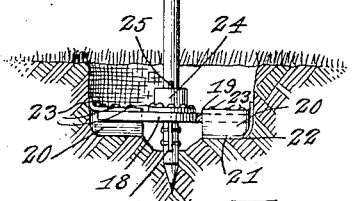
Figure 3 is an enlarged sectional view taken on the line 3—3 of Figure 2 looking in the direction of the arrows.
Figure 3:
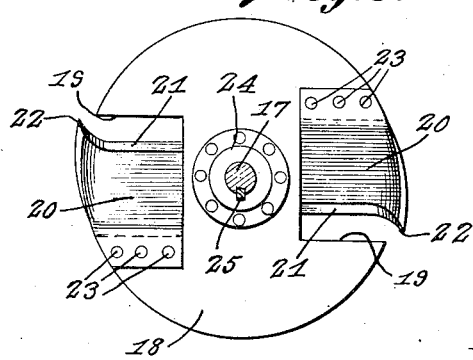

Referring to the drawing in detail, 10 designates a gear housing having a removable top plate 11 while at the bottom and one side are bearing bosses 12 and 13, respectively, the plate being removably fitted and held in place by fasteners 14. Confined within the housing 10 is the gear and pinion 15 and 16, respectively. The gear 15 is fixed to an auger shaft 17 carrying near its lower end a disk-like cutter 18, the same being peripherally notched at diametrically opposite sides thereof at 19 and through these notches extend the curved cutter blades 20, these being reversely angled to each other and each is formed with the cutting edge 21 and point 22, respectively.

The blades are riveted or otherwise made fast at 23 to the disk-like cutter 18 and adapted for the cutting of earth on the driving of the shaft 17 for the formation of a hole in the ground. The cutter 18 at its center is formed with a hub 24 keyed or otherwise made fixed at 25 to the shaft 17 for removability of such cutter when required.

The pinion 16 has its stem or stud axle 26 journaled in the bearing boss 13 while the shaft 17 is journaled in the boss 12 and this stud axle has fitted thereto a universal joint 27 which is in association with a slip joint including male and female members 28 and 29, respectively, telescopically interfitted with each other. The male member 28 has joined with it a universal joint 30, which is coupled with a power shaft, a portion thereof being indicated at 31, from any suitable source of power. The universal joints 27 and 30, respectively, are connected in place by cotter pins 32 for separable fastening thereof.

Figure 4:
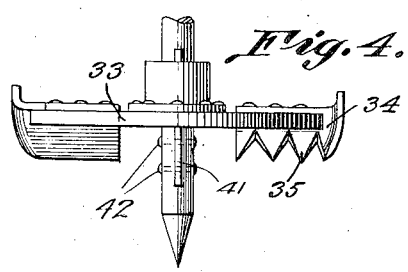
Figure 4 is a fragmentary side elevation of a modification.

In Figure 4 of the drawing there is shown a slight modification wherein the cutter disk 33 has one blade 34 formed with a saw tooth cutting edge 35, this being for relieving rock obstructions in the soil or ground during the operation of the auger.

The top plate 11 at its center is formed with an upstanding lug 36 having passed transversely therethrough a handle bar 37 constituting a pivot for a bail 38 which is adapted to be engaged with the hook 39 of a suspension element, a portion being indicated at 40, so that the auger can be raised or lowered with respect to the work or extracted from a hole after the boring thereof.

The shaft 17 is carried upwardly through the gear 16 in the housing 10 and has its upper end journaled in the top plate 11, being understood, of course, that suitable anti-friction bearings may be associated with the said shaft as well as with the stud axle 26.

The shaft 17 at the lower end thereof has formed therein a suitable transverse slot for accommodating a blade 41 disposed beneath the disk-like cutter 18. This blade 41 is outwardly tapered and is held secure by rivets or other fasteners 42, the purpose of the blade 41 being to clean out the center of the hole when the auger is in operation for the boring of such hole and in this manner the dirt will be directed laterally in the path of the cutting blades 20.

What is claimed is:

An auger of the character described comprising a gear housing forming a head having a removable top cover, gear and pinion within the housing and meshing with each other, an auger shaft journaled in the housing and fixed to said gear, an auger cutter carried by said shaft, slip and universal joint connections with the pinion and adapted for driving connection with a source of power, a center lug rising from the said cover, a handle bar engaged in the lug, and a hoist bail straddling the lug and pivoted to the handle bar.

ELMER L. PRIBYL.